(12) United States Patent
Terao (10) Patent No.: US 8,467,139 B2
(45) Date of Patent: Jun. 18, 2013

(54) OPTICAL DEVICE, OPTICAL APPARATUS, AND METHOD OF MANUFACTURING THE SAME

(75) Inventor: Kentaro Terao, Tokyo (JP)

(73) Assignee: Nikon Corporation, Tokyo (JP)

( * ) Notice: Subject to any disclaimer, the term of this patent is extended or adjusted under 35 U.S.C. 154(b) by 29 days.

(21) Appl. No.: 13/013,138

(22) Filed: Jan. 25, 2011

(65) Prior Publication Data

US 2011/0181969 A1     Jul. 28, 2011

(30) Foreign Application Priority Data

Jan. 28, 2010   (JP) ................................ 2010-017186

(51) Int. Cl.
  *G02B 7/02*   (2006.01)
  *G02B 15/14*  (2006.01)
(52) U.S. Cl.
  USPC ............ 359/819; 359/699; 359/700; 359/694
(58) Field of Classification Search
  USPC .................... 359/694–704, 811–830
  See application file for complete search history.

(56) References Cited

U.S. PATENT DOCUMENTS

| | | | |
|---|---|---|---|
| 6,909,558 B2 | 6/2005 | Orimo et al. ................. | 359/694 |
| 2006/0256446 A1 | 11/2006 | Tanaka et al. ................ | 359/641 |
| 2009/0148092 A1* | 6/2009 | Otsuka ......................... | 384/569 |

FOREIGN PATENT DOCUMENTS

| | | |
|---|---|---|
| JP | 52-43430 | 9/1975 |
| JP | 58-19525 | 7/1981 |
| JP | 01-107223 | 4/1989 |
| JP | 2-113214 | 4/1990 |
| JP | 4-225307 | 8/1992 |
| JP | 2002-196205 | 7/2002 |
| JP | 2003-029114 | 1/2003 |
| JP | 2006-078827 | 3/2006 |
| JP | 2006-235287 | 9/2006 |
| JP | 2007-133089 | 5/2007 |
| JP | 2007-139947 | 6/2007 |
| JP | 2009-042531 | 2/2009 |

OTHER PUBLICATIONS

Notification of Reasons for Refusal received in a counterpart application from the Japanese Patent Office mailed Dec. 6, 2011 with English translation (4 pages).
Office Action dated Jun. 5, 2012 issued in corresponding Chinese Patent Application No. 201110062293.2 with English translation.

\* cited by examiner

*Primary Examiner* — Mohammed Hasan
(74) *Attorney, Agent, or Firm* — Kratz, Quintos & Hanson, LLP (57) ABSTRACT

An optical device includes: a holding frame holding an optical system; a tubular member provided at an outer circumferential surface with a first concave groove and at an inner circumferential surface with a second concave groove, and holding the holding frame; and an eccentric pin penetrating through the first and second concave grooves, including one end attached to the holding frame, and eccentrically rotating against the first and second concave grooves in response to a force applied to the other end of the eccentric pin. A length, in a first direction intersecting a penetrating direction through which the eccentric pin penetrates, of the first concave groove is greater than a length, in a second direction intersecting the first direction and the penetrating direction, of the first concave groove.

13 Claims, 12 Drawing Sheets

OPTICAL DEVICE, OPTICAL APPARATUS, AND METHOD OF MANUFACTURING THE SAME

CROSS-REFERENCE TO RELATED APPLICATION

This application is based upon and claims the benefit of priority of the prior Japanese Patent Application No. 2010-017186, filed on Jan. 28, 2010, the entire contents of which are incorporated herein by reference.

FIELD

The present invention relates to an optical device, an optical apparatus, and a method of manufacturing the same.

BACKGROUND

Japanese Unexamined Patent application publication No. 2-113214 (Patent Document 1) discloses a technology to adjust the inclination of the optical axis of a lens barrel installed in a device which moves a lens by a use of a cam mechanism. In the technology disclosed in the above patent Document, a cam pin provided in the lens barrel is eccentrically rotated within a cam groove, thereby movably adjusting the lens barrel in the optical axis direction.

However, in the technology disclosed in Patent Document 1, a rattle may occur between the cam pin and the cam groove, and the inclination of the optical axis alignment may not be stably adjusted.

SUMMARY

According to a first aspect of the present invention, there is provided an optical device including: a holding frame holding an optical system; a tubular member provided at an outer circumferential surface with a first concave groove and at an inner circumferential surface with a second concave groove, and holding the holding frame; and an eccentric pin penetrating through the first and second concave grooves, including one end attached to the holding frame, and eccentrically rotating against the first and second concave grooves in response to a force applied to the other end of the eccentric pin, wherein a length, in a first direction intersecting a penetrating direction through which the eccentric pin penetrates, of the first concave groove is greater than a length, in a second direction intersecting the first direction and the penetrating direction, of the first concave groove, wherein a length, in the first direction, of the second concave groove is smaller than a length, in the second direction, of the second concave groove.

The eccentric pin may include a first outer circumferential surface facing the first concave groove, and a second outer circumferential surface facing the second concave groove and different from the first outer circumferential surface in shape. The first outer circumferential surface may be guided in the first direction by the first concave groove, and the second outer circumferential surface may be guided in the second direction by the second concave groove. A clearance between an end of the first concave groove in the first direction and the first outer circumferential surface may be greater than a clearance between an end of the second concave groove in the second direction and the second outer circumferential surface, and a clearance between an end of the second concave groove in the first direction and the second outer circumferential surface may be smaller than a clearance between an end of the second concave groove in the second direction and the second outer circumferential surface.

The eccentric pin may include portions respectively arranged within the first and second concave grooves and each including a columnar shape. The length, in the second direction, of the first concave groove may be greater than the length, in the second direction, of the second concave groove. The first direction may be a circumferential direction about an optical axis of the optical system, and the second direction may be a direction of the optical axis.

According to a second aspect of the present invention, there is provided an optical apparatus including an optical device, and the optical device including: a holding frame holding an optical system; a tubular member provided at an outer circumferential surface with a first concave groove and at an inner circumferential surface with a second concave groove, and holding the holding frame; and an eccentric pin penetrating through the first and second concave grooves, including one end attached to the holding frame, and eccentrically rotating against the first and second concave grooves in response to a force applied to the other end of the eccentric pin, wherein a length, in a first direction intersecting a penetrating direction through which the eccentric pin penetrates, of the first concave groove is greater than a length, in a second direction intersecting the first direction and the penetrating direction, of the first concave groove, wherein a length, in the first direction, of the second concave groove is smaller than a length, in the second direction, of the second concave groove.

According to a third aspect of the present invention, there is provided an optical apparatus including: a holding frame holding an optical system; a tubular member arranged at an outer circumferential side of the holding frame, and housing the holding frame; a first oblong hole formed at an outer circumferential side of the tubular member; a second oblong hole formed at an inner circumferential side of the tubular member; and an eccentric pin for positioning the holding frame with respect to the tubular member with the eccentric pin penetrating through the first and second oblong holes, wherein a lengthwise direction of the first oblong hole intersects with a lengthwise direction of the second oblong hole when viewed from the outer circumferential side of the tubular member.

The lengthwise direction of the first oblong hole may be a circumferential direction about an optical axis of the optical system, and the lengthwise direction of the second oblong hole may be a direction of the optical axis. The eccentric pin may include: a first columnar portion is located within the first oblong hole when the eccentric pin positions the holding frame with respect to the tubular member; and a second columnar portion is located within the second oblong hole when the eccentric pin positions the holding frame with respect to the tubular member, and wherein a position of a central axis of the first columnar portion is different from a position of a central axis of the second columnar portion when viewed from the outer circumferential side of the tubular member.

The eccentric pin may be rotatable about the central axis of the second column portion with respect to the holding frame while the eccentric pin penetrating through the first and second oblong holes, and a screw may be provided for securing a position of the eccentric pin against the holding frame.

According to a fourth aspect of the present invention, there is provided a method of manufacturing an optical device, the optical device including: a holding frame holding an optical system; a tubular member provided at an outer circumferential surface with a first concave groove and at an inner circumferential surface with a second concave groove, and holding the holding frame; and an eccentric pin penetrating through the first and second concave grooves, including one end attached to the holding frame, and eccentrically rotating against the first and second concave grooves in response to a force applied to the other end of the eccentric pin, wherein a length, in a first direction intersecting a penetrating direction through which the eccentric pin penetrates, of the first concave groove is greater than a length, in a second direction intersecting the first direction and the penetrating direction, of the first concave groove, wherein a length, in the first direction, of the second concave groove is smaller than a length, in the second direction, of the second concave groove.

DESCRIPTION OF EMBODIMENTS

Figure 1:
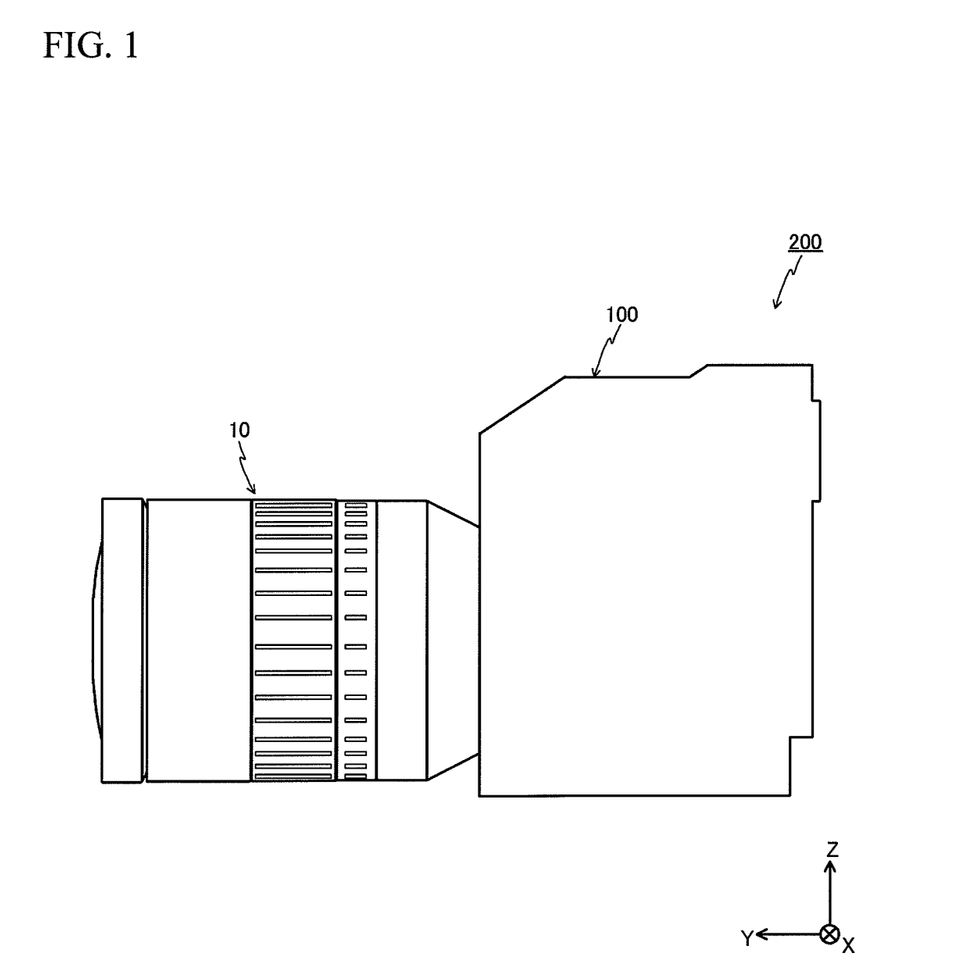
FIG. 1 is a schematic view of an image device according to one embodiment.

An optical device and an optical apparatus according to one embodiment will be described in detail with reference to FIGS. 1 to 12B. FIG. 1 is a schematic view of an image device 200 according to one embodiment. The imaging device 200 according to the present embodiment is a digital camera of single-lens reflex type, and includes an imaging device main body 100 and a lens barrel 10. Additionally, hereinafter, the optical axis direction of a lens held in the lens barrel 10 is Y-axis direction, and the directions perpendicular to the Y-axis direction are X-axis and Z-axis directions.

The imaging device main body 100 picks up images formed by the lens held in the lens barrel 10. Additionally, an internal structure of the imaging device main body 100 is similar to that of a well-known single-lens reflex digital camera. Therefore, their detailed description will be omitted.

Figure 2:
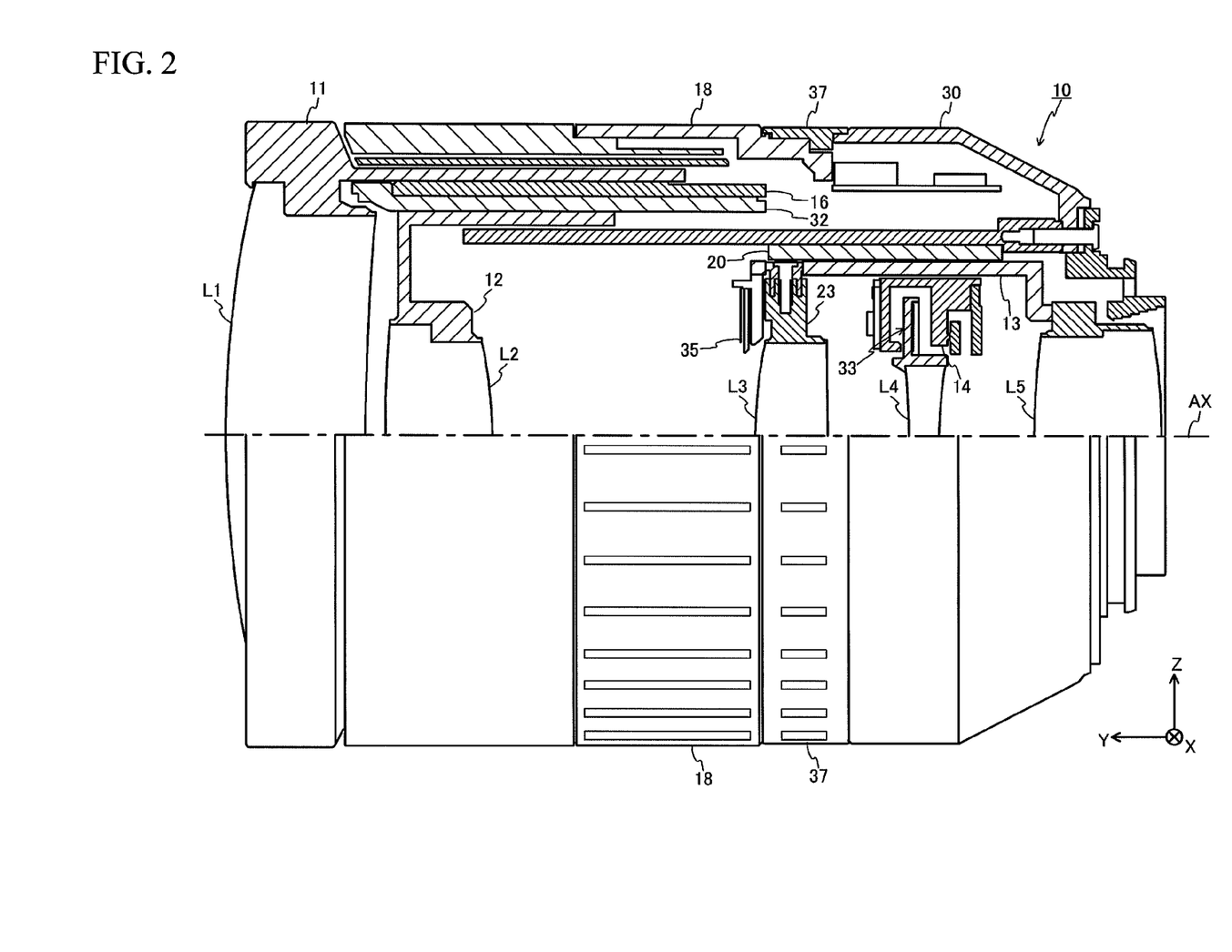
FIG. 2 is a partial cross-sectional view of a lens barrel.

FIG. 2 is a partial cross-sectional view of the lens barrel 10. As illustrated in FIG. 2, the lens barrel 10 includes a first lens group L1, a second lens group L2, a third lens group L3, a fourth lens group L4, and a fifth lens group L5 which are arranged on a common optical axis AX. Also, the lens barrel 10 includes a secured tube 30; a first lens group sliding tube 11 holding the first lens group L1; a second lens group sliding tube 12 holding the second lens group L2; a third and second lens groups sliding tube 13 holding the third and fifth lens groups L3 and L5; and a fourth lens group tube 14 holding the fourth lens group L4.

The first lens group sliding tube 11 is interlocked with a zoom drive tube 16 provided within the first lens group sliding tube 11. This zoom drive tube 16 is rotated in response to the rotation of a zoom operation ring 18 located in the most outer circumference of the lens barrel 10, the rotation of the zoom drive tube 16 causes the first lens group sliding tube 11 to move in front-back direction (directions along the optical axis AX). Additionally, the zoom operation ring 18 is rotated by a user in the case of changing the magnification ratio (zooming).

The second lens group sliding tube 12 is interlocked with an interlocking ring 32 provided in the outside of the second lens group sliding tube 12. The interlocking ring 32 moves during rotating about the optical axis AX in response to a rotation of a focus ring 37 located in the most outer circumference or the lens barrel 10 or a rotation of a built-in motor. Also, the second lens group sliding tube 12 and the second lens group L2 move, without rotating, in the front-back direction in response to the movement of the interlocking ring 32. Additionally, the interlocking ring 32 also moves in the front-back direction when receiving the rotational force of the zoom operation ring 18 rotated by a user. In other words, the second lens group sliding tube 12 and the second lens group L2 move, without rotating, in the front-back direction even when the zoom operation ring 18 is rotated.

The third and fifth lens groups sliding tube 13 holds the third lens group L3 and the fifth lens group L5 which are spaced from each other in the optical axis AX direction by a given interval. Additionally, a diaphragm mechanism 35 is provided at the +Y end of the third and fifth lens groups sliding tube 13.

The fourth lens group sliding tube 14 is provided at an internal space of the third and fifth lens groups sliding tube 13. The fourth lens group sliding tube 14 holds the fourth lens group L4 through the three voice coil motors 33 constructing a part of an image stabilization unit. The fourth lens group L4 is driven in the XZ plane by the voice coil motor 33.

The third and fifth lens groups sliding tube 13 and the fourth lens group sliding tube 14 respectively engage grooves formed on a cam ring 20 provided in the outside of the sliding tubes 13 and 14. The rotational force of the zoom drive tube 16 rotated by the rotation of the zoom operation ring 18 is transmitted to the cam ring 20. This causes the cam ring 20 to rotate and move in the front-back direction. Next, the third and fifth lens groups sliding tube 13 and the fourth lens group sliding tube 14 move, without rotating, in the front-back direction in response to the operation of the cam ring 20. Additionally, the movable distances of the third and fifth lens groups sliding tube 13 and the fourth lens group sliding tube 14 are different from each other.

At the time of zooming, the lens barrel 10 causes the first to fifth lens groups L1 to L5 to move in the front direction by only the difference in distance (the movable distance of the lens L3 is identical to that of the lens L5) in response to the rotational operation of the zoom operation ring 18. Also, at the time of focusing, only second lens group L2 is caused to move in the front or back direction in response to the rotation of the focus ring 37 or the rotation of the built-in motor.

Figure 3:
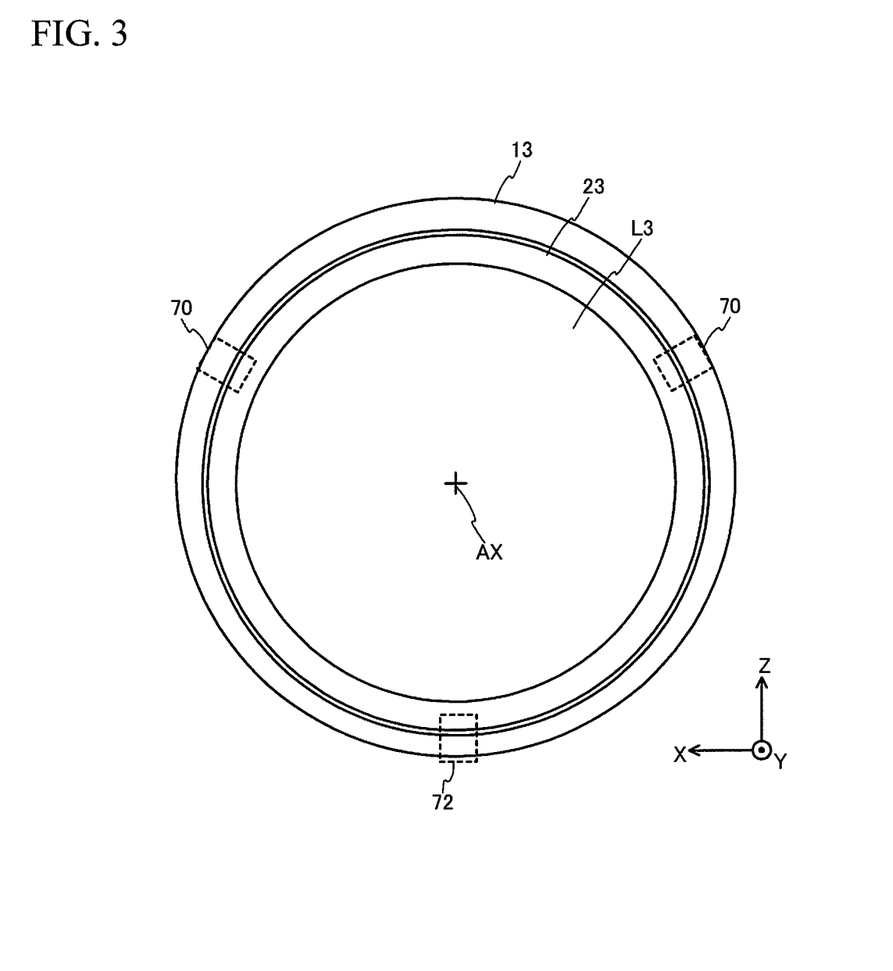
FIG. 3 is a view of a third and fifth lens groups sliding tube and the third lens when viewed in a +Y direction.

A description will be given of a method of holding the third lens group L3 by use of the third and fifth lens groups sliding tube 13 with reference to FIGS. 3 to 8 in detail. FIG. 3 is a schematic view of the third and fifth lens groups sliding tube 13 and the third lens L3 when viewed from the +Y direction. Additionally, the diaphragm mechanism 35 is omitted in FIG. 3.

As illustrated in FIG. 3, the third lens group L3 is held by a ring-shaped lens holding frame 23, and the ring-shaped lens holding frame 23 is secured in the third and fifth lens groups sliding tube 13 by a locking mechanism 72 and two eccentric pin locking mechanisms 70. The locking mechanism 72 is a screw. The lens holding frame 23 is secured with the screw through a through-hole formed in the third and fifth lens groups sliding tube 13, thereby positioning the lower end (−Z' end) of the lens holding frame 23 against the third and fifth lens groups tube 13.

Figure 4:
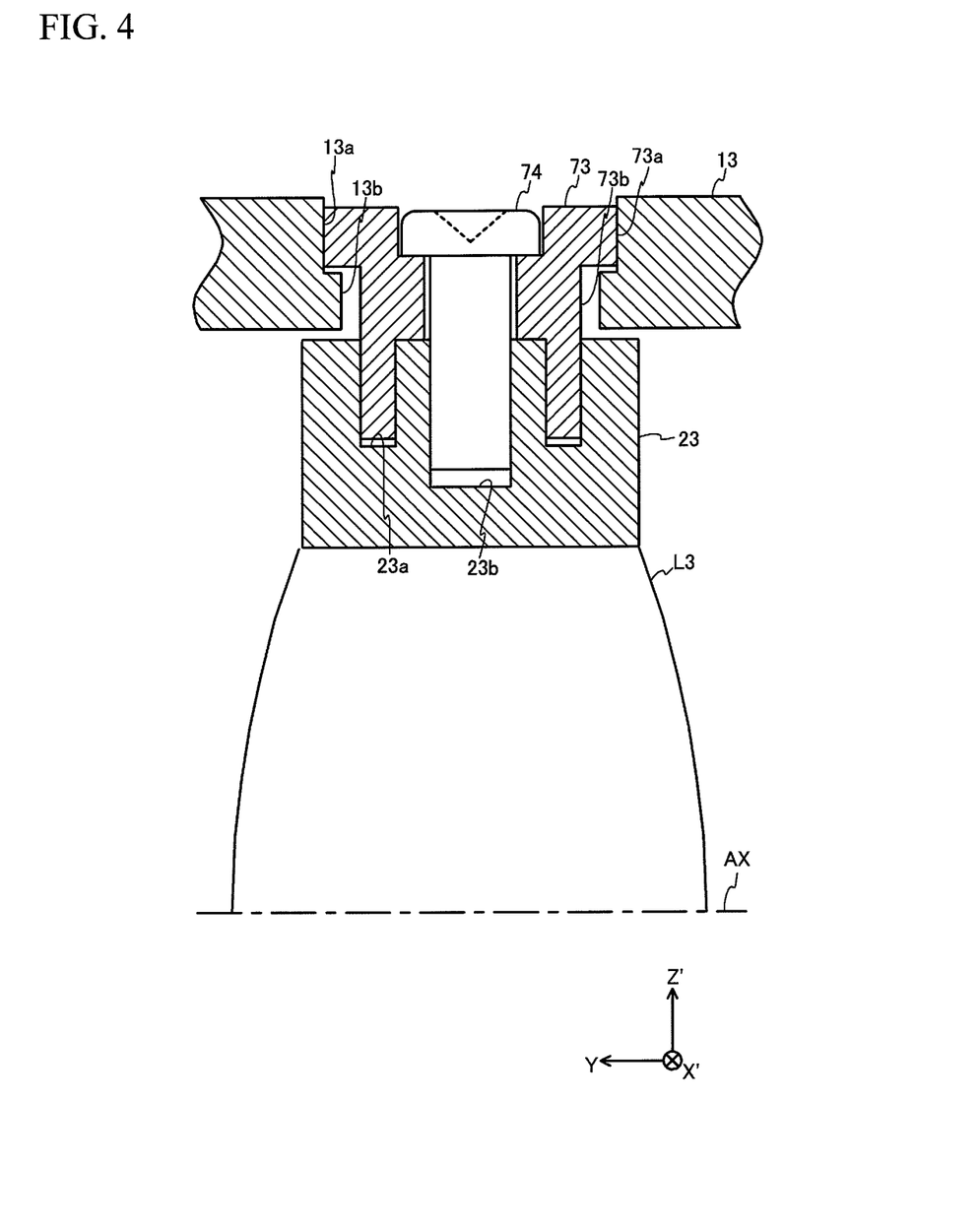
FIG. 4 is a cross-sectional view of an eccentric pin locking mechanism taken along a surface parallel with an optical axis.
Figure 5:
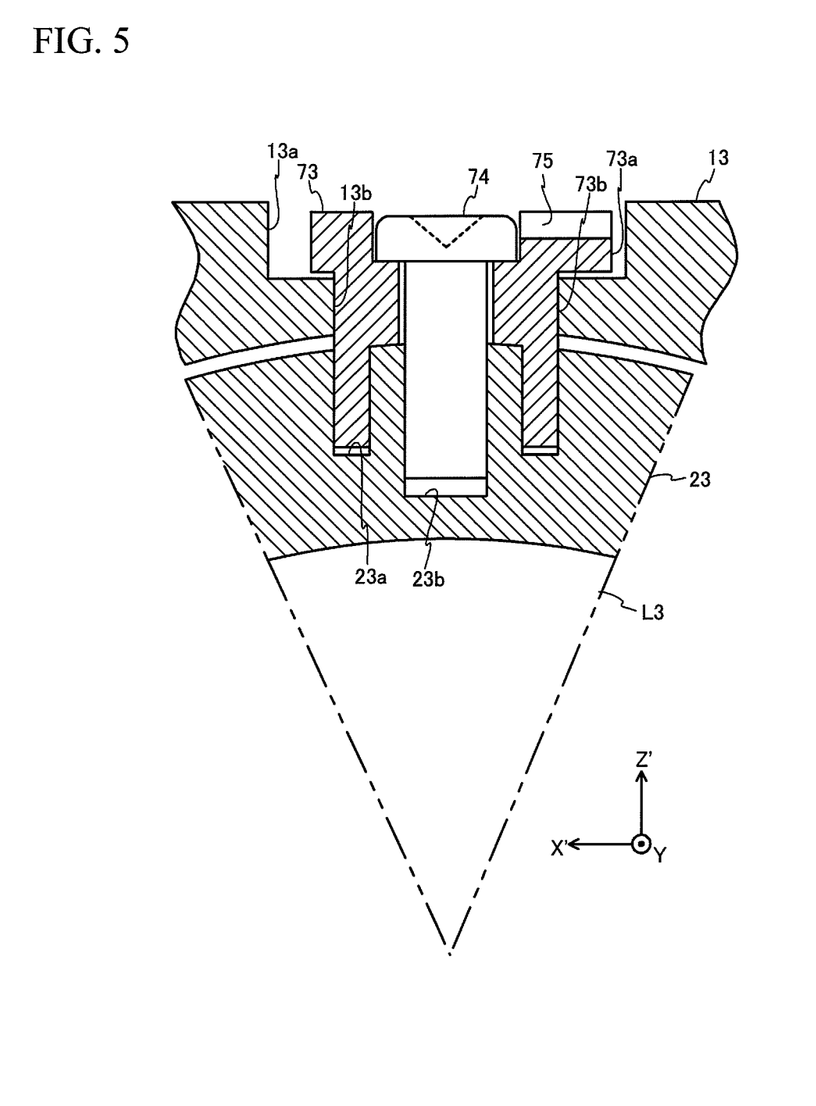
FIG. 5 is a cross-sectional view of the eccentric pin locking mechanism taken along a surface perpendicular to the optical axis.

FIG. 4 is a cross-sectional view of the eccentric pin locking mechanism 70 taken along a surface parallel with the optical axis, and FIG. 5 is a cross-sectional view of the eccentric pin locking mechanism 70 taken along a surface perpendicular to the optical axis. Additionally, in FIGS. 4 and 5, an axis perpendicular to the Y-axis (upper and lower directions on the drawing) is referred to as Z'-axis, and an axis perpendicular to the Y-axis and the Z'-axis is referred to as X'-axis. The X'-axis is also referred to as a rotational direction about the Y-axis (in other words, a tangential direction of a circle about the Y-axis).

As illustrated in FIGS. 4 and 5, the eccentric pin locking mechanism 70 includes an eccentric pin 73 and a screw 74. In a part of a third and fifth lens groups sliding tube 13 provided with the eccentric pin 73, a first concave groove 13a is formed at the outer circumferential side, a second concave groove 13b is formed at the internal circumferential side. These concave grooves 13a and 13b are formed to penetrate through the third and fifth lens groups sliding tube 13. Also, in a part of the lens holding frame 23 provided with the eccentric pin 73, a ring-shaped concave portion 23a with a ring-shaped cross section taken along the X'Y plane is formed, and a threaded hole 23b is formed.

Figure 6A:
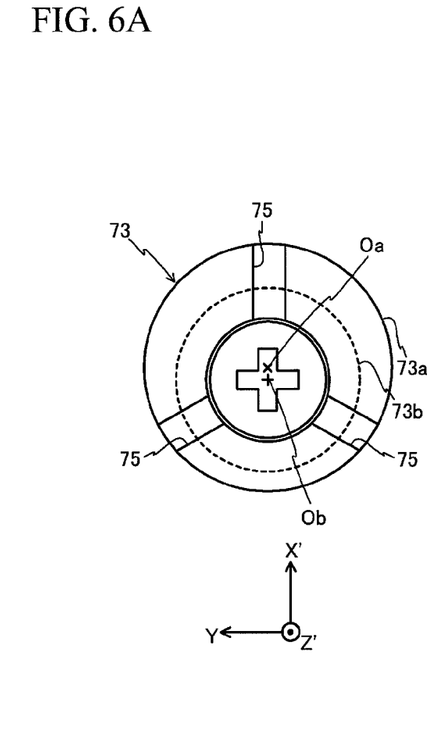
FIG. 6A is a view of the eccentric pin when viewed in a +Z' direction.

The eccentric pin 73 penetrates through the first and second concave grooves 13a and 13b, and one end (−Z' side) of the eccentric pin 73 is inserted into the ring-shaped concave portion 23a of the lens holding frame 23. This eccentric pin 73 includes: a first circumferential surface 73a facing the first concave groove 13a; and a second circumferential surface 73b facing the second concave groove 13a and being different in shape from the first circumferential surface 73a (here, their diameters are different). Each of the portions respectively surrounded with the first and second circumferential surfaces 73a and 73b has a columnar shape. As illustrated in FIG. 6A illustrating the eccentric pin 73 when viewed in the +Z' direction, the central axis Oa of the columnar portion including the first circumferential surface 73a is eccentric with the central axis Ob of the columnar portion including the second circumferential surface 73b. Additionally, the central axis of the screw 74 matches the central axis Ob of the columnar portion including the second circumferential surface 73b.

The upper end (a+Z' end) of the eccentric pin 73 is formed with three channels 75 as illustrated in FIG. 6 (a). The tip of a tool such as a driver is inserted into the channels 75 to be rotated, thereby exerting the rotational force about the Z' axis on the +Z' end of the eccentric pin 73. The eccentric pin 73 receives the rotational force about the Z' axis to eccentrically rotate with respect to the concave grooves 13a and 13b.

Returning to FIGS. 4 and 5, the screw 74 fixes the eccentric pin 73 and the lens holding frame 23, and positions the lens holding frame 23 with respect to the third and fifth lens groups sliding tube 13.

Figure 6B:
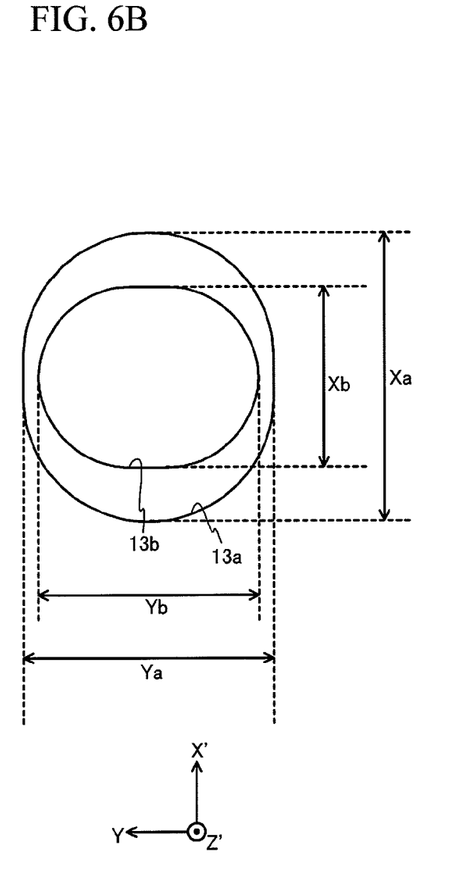
FIG. 6B is a view of first and second concave grooves when viewed in the +Z' direction.

FIG. 6B illustrates the first and second concave grooves 13a and 13b when viewed in a +Z' direction. As illustrated in FIG. 6B, in the first concave groove 13a, a length Xa in the X' axial direction intersecting a penetration direction (the Z' axial direction) of the eccentric pin 73 is set to be greater than a length Ya in the Y-direction perpendicular to the penetration direction (a Z' axial direction) and the X' direction. Also, in the second concave groove 13b, a length Xb in the X' axial direction is set to be smaller than a length Yb in the Y-axis direction. For this reason, the distance between the end of the first concave groove 13a in the X'-axial direction and the first circumferential surface 73a of the eccentric pin 73 (see FIG. 5) is greater than the distance between the end of the first concave groove 13a in the Y-axial direction and the first circumferential surface 73a of the eccentric pin 73 (see FIG. 4). Also, the distance between the end of the second concave groove 13b in the X'-axial direction and the second circumferential surface 73b (see FIG. 5) is smaller than the distance between the end of the second concave groove 13b in the Y-axial direction and the second circumferential surface 73b (see FIG. 4). Thus, the first outer circumferential surface 73a of the eccentric pin 73 is guided in the X' axial-direction by the first concave groove 13a, and the second outer circumferential surface 73b is guided in the Y-axial direction by the second concave groove 13b. Additionally, the length of the first concave groove 13a in the Y-axial direction is set to be greater than the length of the second concave groove 13b in the Y-axial direction.

FIGS. 7A to 8D are schematic views of the change in the position of the eccentric pin 73 in the Y-axial direction in response to a posture of the eccentric pin 73 (posture about the rotating direction about the Z' axis). Additionally, in FIGS. 7A and 8D, the eccentric pin 73 is depicted by a thick solid line, and the first and second concave grooves 13a and 13b are depicted by broken lines. Further, the second outer circumferential surface 73b of the eccentric pin 73 is depicted by a chain double-dashed line.

Figures 7A, 7B, 7C, 7D:
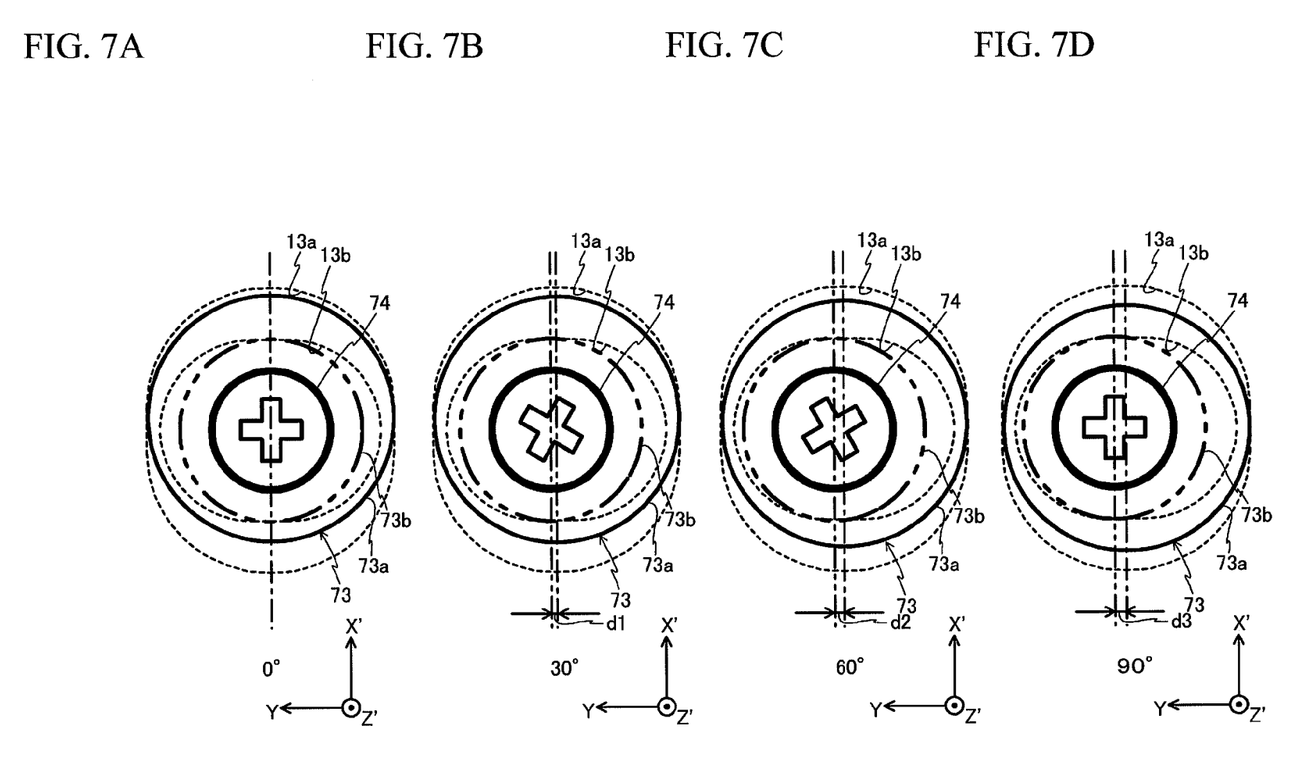
FIGS. 7A to 7D are first explanatory views of the movement of the eccentric pin.

FIG. 7A illustrates a state where the central positions of the first and second concave grooves 13a and 13b match that of the screw 74. This state is referred to as 0-degrees state. When the eccentric pin 73 is clockwise rotated by 30 degrees from the 0-degrees state illustrated in FIG. 7A, the eccentric pin 73 is guided by the second concave grooves 13a and 13b to move in the +Y direction by only the distance d1, as illustrated in FIG. 7B. Also, when the eccentric pin 73 is clockwise rotated by 30 degrees (60 degrees in total), the eccentric pin 73 moves in the +Y direction by only the distance d2 with the 0-degrees state set as a standard, as illustrated in FIG. 7C. Additionally, when the eccentric pin 73 is further rotated by 30 degrees (90 degrees in total) clockwise), the eccentric pin 73 moves in the +Y direction by only the distance d3 with the 0-degrees state set as a standard, as illustrated in FIG. 7D.

Figure 8A:
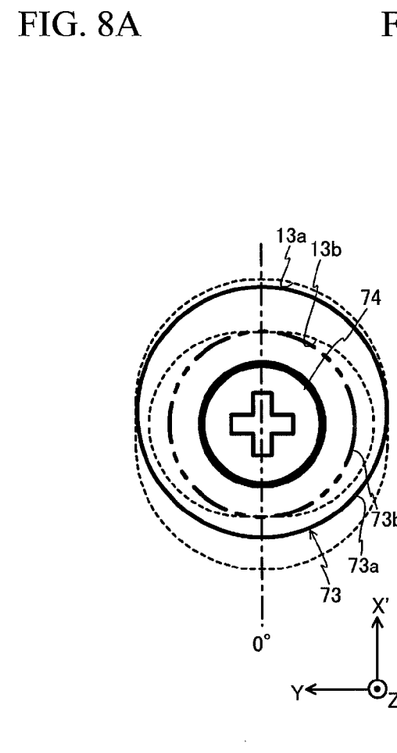
FIGS. 8A to 8D are second explanatory views of the movement of the eccentric pin.
Figure 8B:
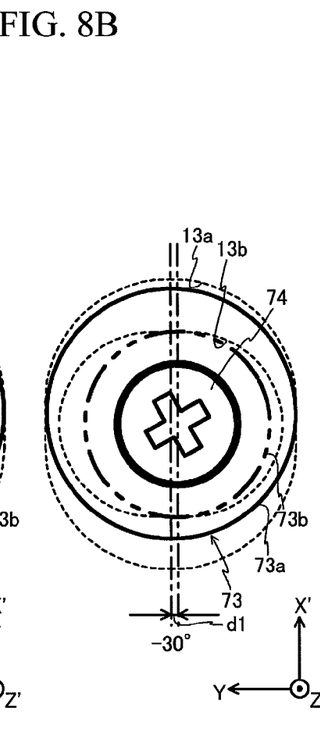
Figure 8C:
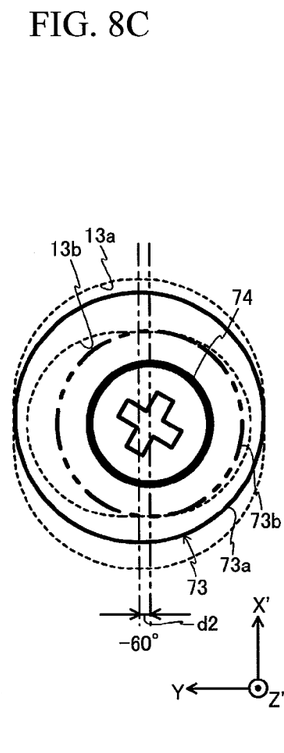
Figure 8D:
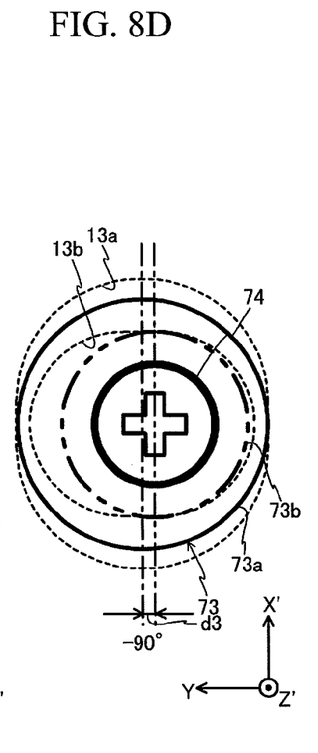

On the other hand, when the eccentric pin 73 is rotated by 30 degrees counterclockwise from the 0-degree state illustrated in FIG. 8A, the eccentric pin 73 is guided by the first and second concave grooves 13a and 13b to move by only the distance d1 in the −Y direction. Further, when the eccentric pin 73 is rotated by 30 degrees (60 degrees in total) counterclockwise, as illustrated in FIG. 8C, as for the eccentric pin 73 moves in the −Y direction by only the distance d2 with the 0-degrees state set as a standard, as illustrated in FIG. 8C. Also, when the eccentric pin 73 is further rotated by 30 degrees (90 degrees in total) counterclockwise, the eccentric pin 73 moves in the −Y direction by only the distance d3 with the 0-degrees state set as a standard, as illustrated in FIG. 8D.

This embodiment is provided with two eccentric pin locking mechanisms 70, which can be displaced as mentioned above, and is also provided with one locking mechanism 72. For this reason, both of the eccentric pins 73 of the eccentric pin locking mechanisms 70 are moved, thereby inclining the third lens group L3 in the rotational axis about the X-axis. Further, the movable distances of the eccentric pins 73 of two eccentric pin locking mechanisms 70 are different from each other, thereby inclining the third lens group L3 in the rotational axis about the Z-axis. In this way, the inclination of the third lens group L3 is adjusted (the alignment of the axis) by use of the eccentric pins 73, thereby improving the optical performance of the lens barrel 10.

Figure 9:
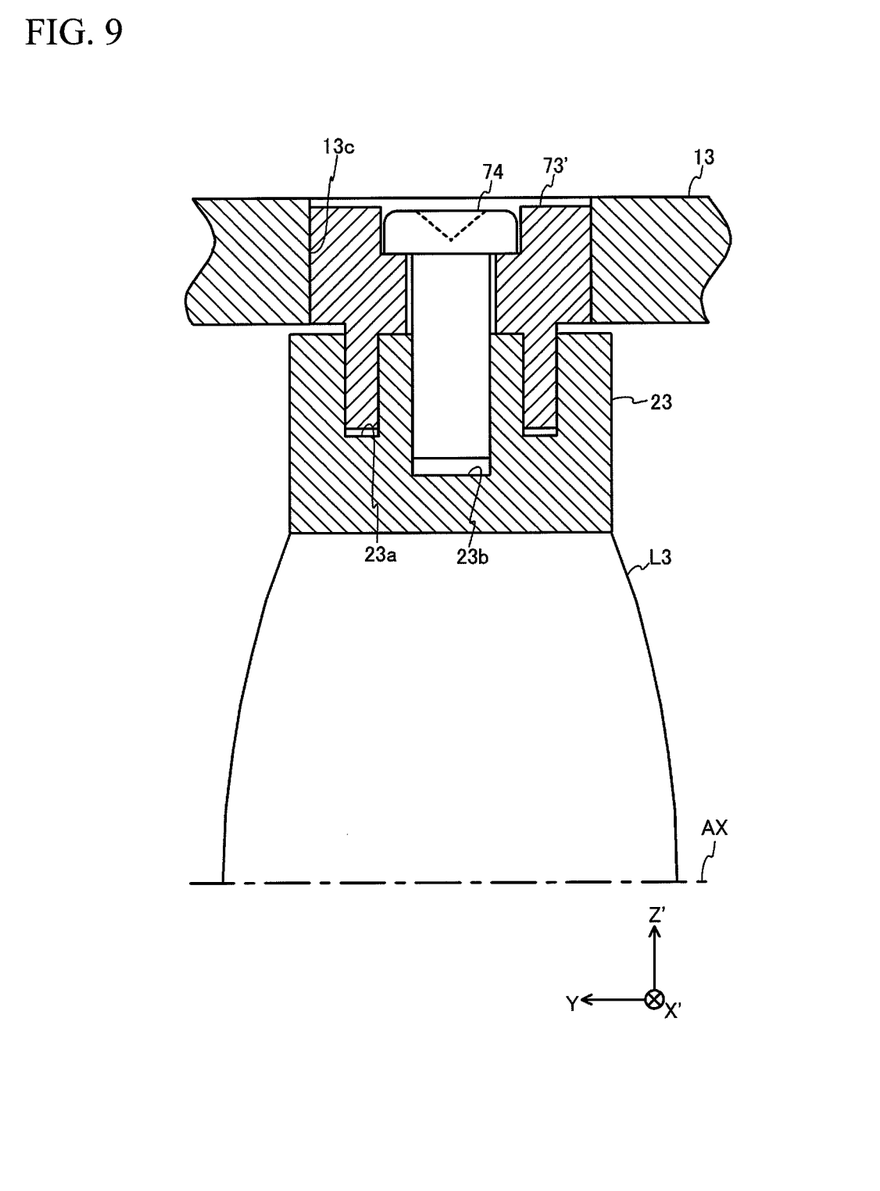
FIG. 9 is a view of a comparative example to correspond to FIG. 4.
Figure 10:
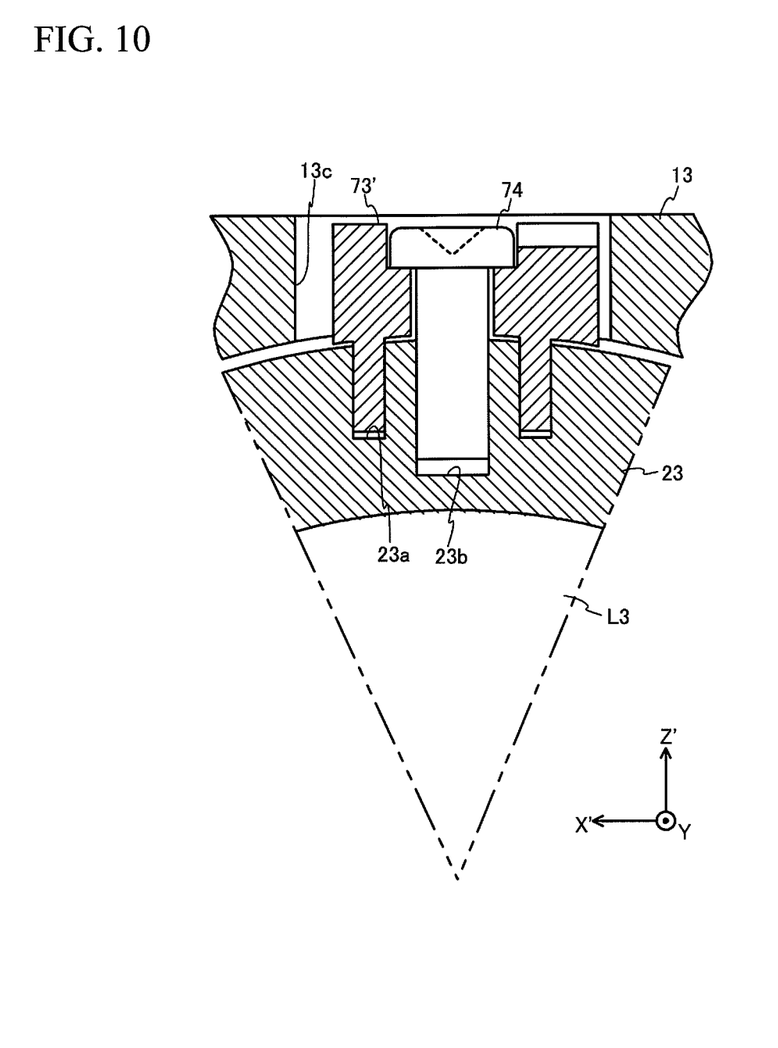
FIG. 10 is a view of the comparative example to correspond to FIG. 5.
Figure 11A:
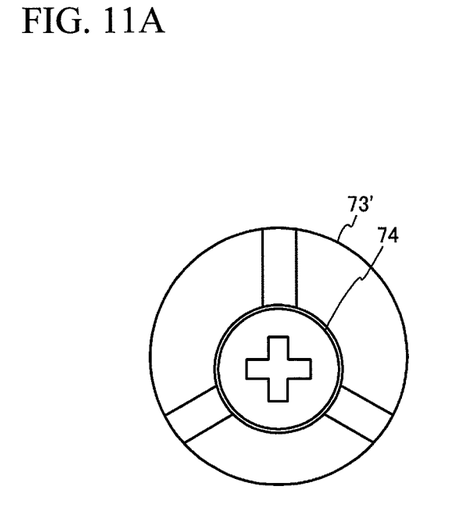
FIGS. 11A and 11B are views of the comparative example and respectively correspond to FIGS. 6A and 6B.
Figure 11B:
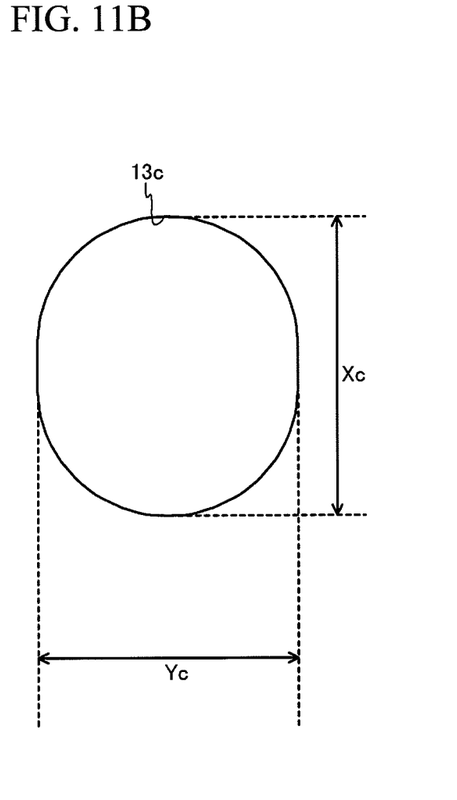

Next, a comparative example will be described with reference to FIGS. 9 to 12B. FIG. 9 corresponds to FIG. 4 illustrating the present embodiment. FIG. 10 corresponds to FIG. 5 illustrating the present embodiment. FIGS. 11A and 11B respectively corresponds to FIGS. 6A and 6B. As illustrated in these drawings, in the comparative example, a concave groove 13c is provided with the third and fifth lens groups sliding tube 13 to penetrate therethrough. This concave groove 13c has a substantially oblong shape as illustrated in FIG. 11B, and a length Yc in the Y-axial direction is set to be smaller than a length Xc in the X'-axial direction. For this reason, the distance between the end of the concave groove 13c in the X'-axial direction and an outer circumferential surface of the eccentric pin 73 (see FIG. 10) is greater than the distance between the end of the concave groove 13c in the Y-axial direction and the outer circumferential surface 73a of the eccentric pin 73 (see FIG. 4). Thus, the outer circumferential surface of the eccentric pin 73 is guided in the X' axial direction by the concave groove 13c.

Figure 12A:
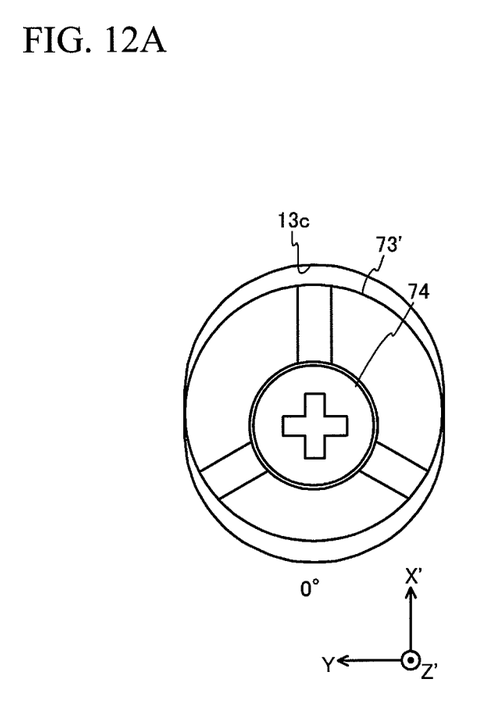
FIG. 12A is a view of the comparative example and corresponds to a 0 degrees state of FIG. 7A.
Figure 12B:
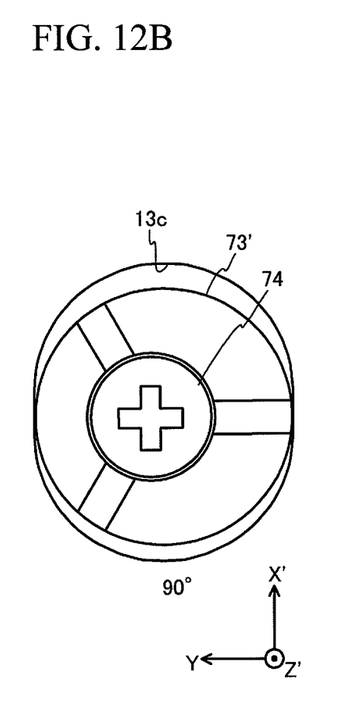
FIG. 12B is a view of a state where the eccentric pin is clockwise rotated by 90 degrees from the state illustrated in FIG. 12A.

FIG. 12A is a view of the comparative example to correspond to the 0-degree state of FIG. 7A. FIG. 12B is a view of a state where an eccentric pin 73' is clockwise rotated by 90 degrees from the state illustrated in FIG. 12A. As illustrated in these drawings, the eccentric pin 73' is restricted in the Y-axial direction. However, the eccentric pin 73' is permitted to move in the X'-direction, thereby easily generating rattling thereof.

In this regard, as illustrated in FIGS. 7 and 8, the eccentric pin 73 according to the present embodiment is always restricted in the Y-axial and X'-axial directions, thereby allowing the third lens group L3 to be held without the rattling as compared with the above comparative example.

As mentioned above in detail, according to the present embodiment, the lens barrel 10 includes: the lens holding frame 23 holding the third lens group L3; the first concave groove 13a formed in the outer circumferential side; the second concave groove 13b formed in the inner circumferential surface; the third and fifth lens groups sliding tube 13 holding the lens holding frame 23; the eccentric pin 73 penetrating through the first and second concave grooves 13a and 13b, including one end attached to the holding frame, and eccentrically rotating against the first and second concave grooves 13a and 13b in response to a force applied to the other end of the eccentric pin 73. The length, in the X'-axial direction, of the first concave groove 13a is set to be greater than the length, in the Y-axial direction thereof. The length, in the X'-axial direction, of the second concave groove 13b is set to be smaller than the length, in the Y-axial direction thereof. Therefore, even when the eccentric pin 73 rotates, a part of the eccentric pin 73 penetrating through the first concave groove 13a can be restricted in the Y-axis direction in the first concave groove 13a. Further, a part of the eccentric pin 73 penetrating through the second concave groove 13b can be restricted in the X'-axis direction in the second concave groove 13b. This can suppress the generating of rattling of the eccentric pin 73 with respect to the third and fifth lens groups sliding tube 13, thereby suppressing the generating of rattling of the lens holding frame 23 against the third and fifth lens groups sliding tube 13. This enables stable alignment of the axis of the third lens group L3. Also, the imaging device 200 according to the present embodiment includes the lens barrel 10 which can preferably adjust the axis, thereby achieving a stably optical performance.

Also, in the present embodiment, the lens holding frame 23 is fixed to the third and fifth lens groups sliding tube 13 by use of two eccentric pin locking mechanisms 70. In this case, the rotational degrees of two eccentric pins 73 of the eccentric pin locking mechanisms 70 have only to be match or to be different from each other, thereby adjusting the axis of the third lens group L3 in the rotational direction about the X-axis and in the rotational direction about the Z-axis. This enables stable alignment of the axis of the third lens group L3 with ease.

Also, according to the present embodiment, the eccentric pin 73 has the portions respectively located within the first and second concave grooves 13a and 13b, and each of the portions has a columnar shape. Therefore, the eccentric pin 73 is smoothly guided by the first and second concave grooves 13a and 13b.

Additionally, in the above embodiment, the first concave groove 13a has the length in the X'-axial direction greater than that in the Y-axial direction, and the second concave groove 13b has the length in the X'-axial direction smaller than that in the Y-axial direction. However, the present invention is not limited to these arrangements. In the first concave groove 13a, the length in a first direction intersecting the penetration direction of the eccentric pin 73 has only to be greater than the length in a second direction intersecting the penetration direction and the first direction. Further, in the second concave groove, the length in the first direction has only to be smaller than that in the second direction. In other words, in the above embodiment, the first direction is arranged to be the Y-axial direction (an optical axis AX direction), the second direction is arranged to be the X'-axial direction. However, the present invention is not limited to these arrangements.

Furthermore, the above embodiment has described the case where the lens holding frame 23 is fixed to the third and fifth lens groups sliding tube 13 by use of two eccentric pin locking mechanisms 70 and one locking mechanism 72. However, the present invention is not limited to these arrangements. For example, the lens holding frame 23 may be fixed to the third and fifth lens groups sliding tube 13 by use of three eccentric pin locking mechanisms 70. In this case, the third lens group L3 can be moved in the Y-axis direction in addition to the rotational directions about the X-axial direction and about the Z-axial direction.

The above embodiment has described the case where the imaging device (the digital camera of the single-lens reflex camera) is employed as an optical apparatus. The present invention is not limited to this. For example, a still camera, a video camera, a mobile telephone, or a telescope may be employed as an optical apparatus. Also, an optical apparatus may be a lens barrel. In this case, a part (a unit) of the lens barrel corresponds to an optical apparatus.

While the exemplary embodiments of the present invention have been illustrated in detail, the present invention is not limited to the above-mentioned embodiments, and other embodiments, variations and modifications may be made without departing from the scope of the present invention.

What is claimed is:
1. An optical device comprising:
a holding frame holding an optical system;

a tubular member provided at an outer circumferential surface with a first concave groove and at an inner circumferential surface with a second concave groove, and holding the holding frame; and an eccentric pin penetrating through the first and second concave grooves, including one end attached to the holding frame, and eccentrically rotating against the first and second concave grooves in response to a force applied to the other end of the eccentric pin, wherein a length, in a first direction intersecting a penetrating direction through which the eccentric pin penetrates, of the first concave groove is greater than a length, in a second direction intersecting the first direction and the penetrating direction, of the first concave groove, wherein a length, in the first direction, of the second concave groove is smaller than a length, in the second direction, of the second concave groove.

2. The optical device of claim 1, wherein the eccentric pin includes a first outer circumferential surface facing the first concave groove, and a second outer circumferential surface facing the second concave groove and different from the first outer circumferential surface in shape.

3. The optical device of claim 2, wherein the first outer circumferential surface is guided in the first direction by the first concave groove, and the second outer circumferential surface is guided in the second direction by the second concave groove.

4. The optical device of claim 2, wherein a clearance between an end of the first concave groove in the first direction and the first outer circumferential surface is greater than a clearance between an end of the second concave groove in the second direction and the second outer circumferential surface, and a clearance between an end of the second concave groove in the first direction and the second outer circumferential surface is smaller than a clearance between an end of the second concave groove in the second direction and the second outer circumferential surface.

5. The optical device of claim 1, wherein the eccentric pin includes portions respectively arranged within the first and second concave grooves and each including a columnar shape.

6. The optical device of claim 1, wherein the length, in the second direction, of the first concave groove is greater than the length, in the second direction, of the second concave groove.

7. The optical device of claim 1, wherein the first direction is a circumferential direction about an optical axis of the optical system, and the second direction is a direction of the optical axis.

8. An optical apparatus comprising an optical device, the optical device comprising:
a holding frame holding an optical system;
a tubular member provided at an outer circumferential surface with a first concave groove and at an inner circumferential surface with a second concave groove, and holding the holding frame; and
an eccentric pin penetrating through the first and second concave grooves, including one end attached to the holding frame, and eccentrically rotating against the first and second concave grooves in response to a force applied to the other end of the eccentric pin,
wherein a length, in a first direction intersecting a penetrating direction through which the eccentric pin penetrates, of the first concave groove is greater than a length, in a second direction intersecting the first direction and the penetrating direction, of the first concave groove,
wherein a length, in the first direction, of the second concave groove is smaller than a length, in the second direction, of the second concave groove.

9. An optical apparatus comprising:
a holding frame holding an optical system;
a tubular member arranged at an outer circumferential side of the holding frame, and housing the holding frame;
a first oblong hole formed at an outer circumferential side of the tubular member;
a second oblong hole formed at an inner circumferential side of the tubular member; and
an eccentric pin for positioning the holding frame with respect to the tubular member with the eccentric pin penetrating through the first and second oblong holes,
wherein a lengthwise direction of the first oblong hole intersects with a lengthwise direction of the second oblong hole when viewed from the outer circumferential side of the tubular member.

10. The optical apparatus of claim 9, wherein the lengthwise direction of the first oblong hole is a circumferential direction about an optical axis of the optical system, and the lengthwise direction of the second oblong hole is a direction of the optical axis.

11. The optical apparatus of claim 9, wherein the eccentric pin includes: a first columnar portion is located within the first oblong hole when the eccentric pin positions the holding frame with respect to the tubular member; and a second columnar portion is located within the second oblong hole when the eccentric pin positions the holding frame with respect to the tubular member,
wherein a position of a central axis of the first columnar portion is different from a position of a central axis of the second columnar portion when viewed from the outer circumferential side of the tubular member.

12. The optical apparatus of claim 11, wherein the eccentric pin is rotatable about the central axis of the second column portion with respect to the holding frame while the eccentric pin penetrating through the first and second oblong holes, and a screw is provided for securing a position of the eccentric pin against the holding frame.

13. A method of manufacturing an optical device, the optical device comprising:
a holding frame holding an optical system;
a tubular member provided at an outer circumferential surface with a first concave groove and at an inner circumferential surface with a second concave groove, and holding the holding frame; and
an eccentric pin penetrating through the first and second concave grooves, including one end attached to the holding frame, and eccentrically rotating against the first and second concave grooves in response to a force applied to the other end of the eccentric pin,
wherein a length, in a first direction intersecting a penetrating direction through which the eccentric pin penetrates, of the first concave groove is greater than a length, in a second direction intersecting the first direction and the penetrating direction, of the first concave groove,
wherein a length, in the first direction, of the second concave groove is smaller than a length, in the second direction, of the second concave groove.

* * * * *